(12) United States Patent
Kim et al.

(10) Patent No.: US 8,743,898 B2
(45) Date of Patent: Jun. 3, 2014

(54) APPARATUS AND METHOD FOR TRANSMITTING AND RECEIVING MULTICAST BROADCAST SERVICE DATA

(75) Inventors: Eunkyung Kim, Seoul (KR); Soojung Jung, Daejeon (KR); Jae Sun Cha, Daejeon (KR); Sung Cheol Chang, Daejeon (KR); Hyun Lee, Daejeon (KR); Chul Sik Yoon, Seoul (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 165 days.

(21) Appl. No.: 13/175,428

(22) Filed: Jul. 1, 2011

(65) Prior Publication Data

US 2012/0008638 A1    Jan. 12, 2012

(30) Foreign Application Priority Data

Jul. 1, 2010   (KR) .................. 10-2010-0063330
Jul. 1, 2011   (KR) .................. 10-2011-0065527

(51) Int. Cl.
    *H04J 3/26* (2006.01)
(52) U.S. Cl.
    USPC .......................................... 370/432
(58) Field of Classification Search
    None
    See application file for complete search history.

(56) References Cited

U.S. PATENT DOCUMENTS

| 7,359,357 | B2 | 4/2008 | Rhee et al. | |
| 2009/0034459 | A1* | 2/2009 | Shousterman et al. | 370/329 |
| 2009/0147877 | A1* | 6/2009 | Connors et al. | 375/267 |
| 2011/0007683 | A1* | 1/2011 | Kim et al. | 370/312 |
| 2012/0294221 | A1* | 11/2012 | Choi et al. | 370/312 |

OTHER PUBLICATIONS

"Draft Amendment to IEEE Standard for Local and metropolitan area networks; Part 16: Air Interface for Fixed and Mobile Broadband Wireless Access Systems", IEEE P802.16m/D6, May 2010, 932 pages.

* cited by examiner

*Primary Examiner* — Gregory Sefcheck
(74) *Attorney, Agent, or Firm* — NSIP Law

(57) ABSTRACT

An MBS transmitting apparatus allocates a plurality of time intervals of an MBS transmission carrier to an MBS region and a non-MBS region and generates region allocation information of the MBS region and the non-MBS region. The MBS transmitting apparatus allocates the time intervals, allocated to the MBS region, to one or more MBS zones and generates MBS zone allocation information of the one or more MBS zones. The MBS transmitting apparatus transmits the region allocation information and the MBS zone allocation information and transmits the MBS data through the time intervals allocated to the MBS region.

20 Claims, 11 Drawing Sheets

APPARATUS AND METHOD FOR TRANSMITTING AND RECEIVING MULTICAST BROADCAST SERVICE DATA

This application claims priority to and the benefit of Korean Patent Application No. 10-2010-0063330 filed in the Korean Intellectual Property Office on Jul. 1, 2010 and 10-2011-0065527 filed in the Korean Intellectual Property Office on Jul. 1, 2011, the entire contents of which are incorporated herein by reference.

BACKGROUND OF THE INVENTION (a) Field of the Invention

The present invention relates to a base station, a relay station, and a mobile station. More particularly, the present invention relates to a method and apparatus for sending and receiving Multicast Broadcast Service (MBS) data.

(b) Description of the Related Art

A mobile communication system can support a multi-carrier.

In this case, a carrier for non-MBS that chiefly serves unicast and a carrier for MBS may be separately allocated to a mobile station.

However, a mobile station including one transceiver receives only non-MBS data or only MBS data in a specific time interval because it has to receive non-MBS data and MBS data through carrier switching.

Accordingly, an MBS transmitting apparatus needs to perform scheduling in order to transmit non-MBS data and MBS data. However, since the MBS data is transmitted to a plurality of mobile stations, the structure of the MBS transmitting apparatus for scheduling the plurality of mobile stations may become complicated.

Meanwhile, an MBS transmitting apparatus can support a mixed carrier that may include a non-MBS region for transmitting non-MBS data and an MBS region for transmitting MBS data. However, although the MBS transmitting apparatus uses the mixed carrier, the bandwidth may be insufficient to allocate the non-MBS region of the mixed carrier to all mobile stations that receive the MBS data transmitted via the mixed carrier. Consequently, the MBS transmitting apparatus is required to transmit the non-MBS data to some of the mobile stations through a carrier not the mixed carrier. Accordingly, the structure of the MBS transmitting apparatus may become complicated.

A signal transmitted through one carrier supporting MBS may be divided into a plurality of subbands on the frequency axis. All the plurality of subbands may be allocated to an MBS region. Furthermore, the plurality of subbands may be allocated to an MBS region and a non-MBS region or to an MBS region and an unused region. Each region includes at least one subband.

Meanwhile, the MBS region may be divided into a plurality of MBS zones. Each MBS zone includes at least one subband.

Accordingly, an MBS transmitting apparatus is required to send information to an MBS receiving apparatus so that the MBS receiving apparatus can recognize MBS zones and identify each MBS zone based on the information.

Therefore, a method in which an MBS transmitting apparatus provides allocation information of zones and a zone flag indicating whether the last zone is allocated to a non-MBS region to an MBS receiving apparatus may be used.

According to this method, in a network including a zone #1, a zone #2, and a zone #3, the zone #1 and the zone #2 are allocated to MBS, and the zone #3 is allocated to unicast or MBS.

Accordingly, a mobile station served by an MBS transmitting apparatus belonging to the zone #1 and the zone #2 can recognize that the zone #1 and the zone #2 have been allocated to the MBS region based on zone allocation information and can recognize that the zone #3 has been allocated to the non-MBS region based on a zone flag.

However, the mobile station served by the MBS transmitting apparatus belonging to only the zone #1 cannot recognize whether the zone #2 has been allocated to the non-MBS region. Accordingly, the MBS transmitting apparatus belonging to only the zone #1 cannot allocate the zone #2 to the non-MBS region. Furthermore, the mobile station served by the MBS transmitting apparatus belonging to only the zone #2 cannot recognize whether the zone #1 has been allocated to the non-MBS region. Accordingly, the MBS transmitting apparatus belonging to only the zone #2 cannot allocate the zone #1 to the non-MBS region. Accordingly, waste of the bandwidth may be caused.

SUMMARY OF THE INVENTION

An aspect of the present invention provides a region allocation method and an MBS zone allocation method that allow an MBS transmitting apparatus to perform scheduling efficiently.

Another aspect of the present invention provides an MBS zone allocation information providing method, capable of avoiding waste of the bandwidth.

According to an embodiment of the present invention, a method of transmitting MBS data is provided in an MBS transmitting apparatus. The method includes allocating a plurality of time intervals of an MBS transmission carrier to an MBS region and a non-MBS region; generating region allocation information of the MBS region as well as the non-MBS region; allocating time intervals, allocated to the MBS region, to one or more MBS zones; generating MBS zone allocation information of the one or more MBS zones; transmitting the region allocation information and the MBS zone allocation information; and transmitting MBS data through the time intervals allocated to the MBS region, wherein the region allocation information indicates whether each time interval is allocated to the MBS region or to the non-MBS region.

The region allocation information may include a first bitmap including a plurality of bits corresponding to the plurality of time intervals, and each bit of the first bitmap may indicate whether a corresponding time interval is allocated to the MBS region or to the non-MBS region.

Allocating the time intervals allocated to the MBS region to one or more MBS zones may include allocating each time interval allocated to the MBS region to the one or more MBS zones, respectively, and the MBS zone allocation information may indicate whether each time interval allocated to the MBS region is allocated to which MBS zone.

The MBS zone allocation information may include a second bitmap including a plurality of bits corresponding to remaining time intervals other than the first time interval, among the time intervals allocated to the MBS region. Each bit of the second bitmap may indicate whether a corresponding time interval is allocated to the same MBS region as that allocated by the previous time interval.

Allocating the time intervals allocated to the MBS region to one or more MBS zones may include allocating a plurality of subbands within the time intervals allocated to the MBS region to the one or more MBS zones, and the MBS zone allocation information may indicate whether each plurality of subbands is allocated to which MBS zone.

The MBS zone allocation information may include a second bitmap including a plurality of bits corresponding to remaining subbands other than the first time interval among the subbands allocated to the MBS region. Each bit of the second bitmap may indicate whether a corresponding subband is allocated to the same MBS region as that allocated by the previous subband.

The method may further include transmitting non-MBS data through time intervals allocated to the non-MBS region.

The non-MBS region may correspond to an unused region.

The region allocation information may be broadcast through a system information message, and the MBS zone allocation information may be broadcast through an MBS-specific message.

An MBS transmitting apparatus according to another embodiment of the present invention includes a region allocator configured to allocate a plurality of time intervals of an MBS transmission carrier to an MBS region and a non-MBS region; a region allocation information generator configured to generate region allocation information of the MBS region and the non-MBS region; an MBS zone allocator configured to allocate the time intervals allocated to the MBS region to one or more MBS zones; an MBS zone allocation information generator configured to generate MBS zone allocation information of the one or more MBS zones; a control data transmitter configured to transmit the region allocation information and the MBS zone allocation information; and an MBS data transmitter configured to transmit MBS data through time intervals allocated to the MBS region, wherein the region allocation information may indicate whether each plurality of time intervals is allocated either to the MBS region or to the non-MBS region.

The region allocation information may include a first bitmap including a plurality of bits corresponding to the plurality of time intervals, and each bit of the first bitmap may indicate whether a corresponding time interval is allocated either to the MBS region or to the non-MBS region.

The MBS zone allocator may allocate the time intervals allocated to the MBS region to the one or more MBS zones, respectively. The MBS zone allocation information may include a second bitmap including a plurality of bits corresponding to remaining time intervals other than the first time interval among the time intervals allocated to the MBS region. Each bit of the second bitmap may indicate whether a corresponding time interval is allocated to the same MBS region as that allocated by the previous time interval.

The MBS zone allocator may allocate a plurality of subbands within the time intervals allocated to the MBS region to the one or more MBS zones. The MBS zone allocation information may include a second bitmap including a plurality of bits corresponding to remaining subbands other than the first subband among the subbands allocated to the MBS region. Each bit of the second bitmap may indicate whether a corresponding subband is allocated to the same MBS region as that allocated by the previous subband.

According to yet another embodiment of the present invention, a method of receiving MBS data in an MBS receiving apparatus is provided. The method includes receiving region allocation information of an MBS region and a non-MBS region; allocating a plurality of time intervals of an MBS transmission carrier to the MBS region and the non-MBS region based on the region allocation information; receiving MBS zone allocation information of the one or more MBS zones; allocating time intervals allocated to the MBS region to one or more MBS zones based on the MBS zone allocation information; and receiving MBS data through the time intervals allocated to the one or more MBS zones, wherein the region allocation information may indicate whether each plurality of time intervals is allocated either to the MBS region or to the non-MBS region.

The region allocation information may include a first bitmap including a plurality of bits corresponding to the plurality of time intervals, and each bit of the first bitmap may indicate whether a corresponding time interval is allocated either to the MBS region or to the non-MBS region.

Allocating the time intervals allocated to the MBS region to one or more MBS zones may include allocating the time intervals allocated to the MBS region to the one or more MBS zones, respectively. The MBS zone allocation information may include a second bitmap including a plurality of bits corresponding to remaining time intervals other than the first time interval among the time intervals allocated to the MBS region, and each bit of the second bitmap may indicate whether a corresponding time interval is allocated to the same MBS zone as that allocated by the previous time interval.

Allocating the time intervals allocated to the MBS region to one or more MBS zones may include allocating a plurality of subbands within the time intervals allocated to the MBS region to the one or more MBS zones. The MBS zone allocation information may include a second bitmap including a plurality of bits corresponding to remaining subbands other than the first subband among the subbands allocated to the MBS region, and each bit of the second bitmap may indicate whether a corresponding subband is allocated to an MBS region identical with an MBS region of a previous subband.

An MBS receiving apparatus according to still yet another embodiment of the present invention includes a control data receiver configured to receive region allocation information of an MBS region and a non-MBS region and MBS zone allocation information of one or more MBS zones; a region allocator configured to allocate a plurality of time intervals of an MBS transmission carrier to the MBS region and the non-MBS region based on the region allocation information; an MBS zone allocator configured to allocate the time intervals allocated to the MBS zone to the one or more MBS zones based on the MBS zone allocation information; and an MBS data receiver configured to receive MBS data through the time intervals allocated to the one or more MBS zones, wherein the region allocation information may indicate whether each plurality of time intervals is allocated either to the MBS region or to the non-MBS region.

The region allocation information may include a first bitmap including a plurality of bits corresponding to the plurality of time intervals, and each bit of the first bitmap may indicate whether a corresponding time interval is allocated either to the MBS region or to the non-MBS region. The MBS zone allocation information may include a second bitmap including a plurality of bits corresponding to remaining time intervals other than the first time interval among the time intervals allocated to the MBS region, and each bit of the second bitmap may indicate whether a corresponding time interval is allocated to the same MBS region as that allocated by the previous time interval.

The region allocation information may include a first bitmap including a plurality of bits corresponding to the plurality of time intervals, and each bit of the first bitmap may indicate whether a corresponding time interval is allocated to the MBS region or to the non-MBS region. The MBS zone allocation information may include a second bitmap including a plurality of bits corresponding to remaining subbands other than the first subband among a plurality of subbands, and each bit of the second bitmap may indicate whether a corresponding subband is allocated to an MBS region identical with an MBS region of a previous subband.

DETAILED DESCRIPTION OF THE EMBODIMENTS

Figure 1:
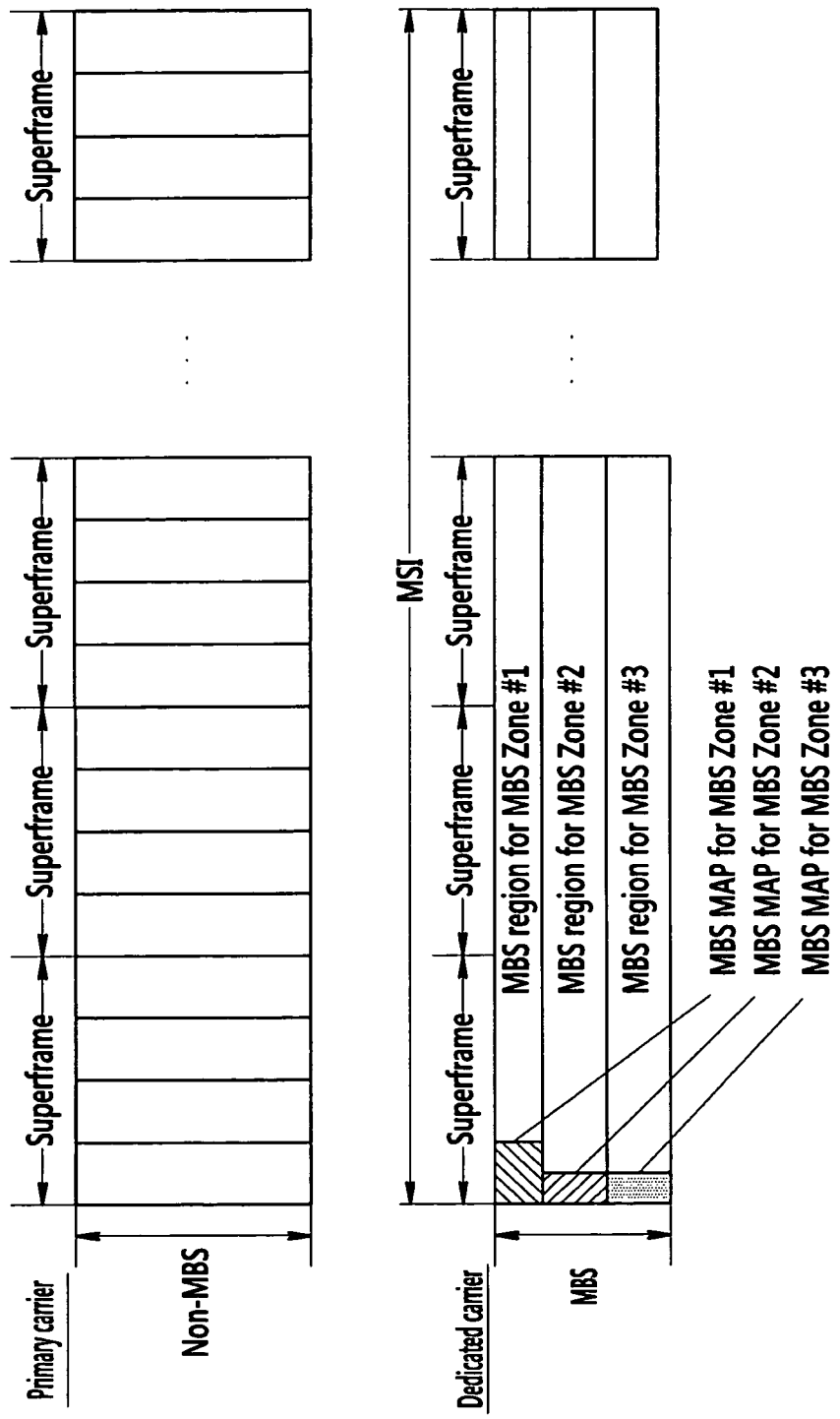
FIG. 1 shows the structure of an MBS carrier according to an embodiment of the present invention.

In the following detailed description, only certain embodiments of the present invention have been shown and described, simply by way of illustration. As those skilled in the art would realize, the described embodiments may be modified in various different ways, all without departing from the spirit or scope of the present invention. Accordingly, the drawings and description are to be regarded as illustrative in nature and not restrictive. Like reference numerals designate like elements throughout the specification.

In the entire specification, in addition, unless explicitly described to the contrary, the word "comprise" and variations such as "comprises" or "comprising," will be understood to imply the inclusion of stated elements but not the exclusion of any other elements.

In this specification, a Mobile Station (MS) may refer to a terminal, a Mobile Terminal (MT), a Subscriber Station (SS), a Portable Subscriber Station (PSS), User Equipment (UE), or an Access Terminal (AT) and may include all or some of the functions of the MT, the SS, the PSS, or the UE.

In this specification, a Base Station (BS) may refer to an Access Point (AP), a Radio Access Station (RAS), a nodeB (Node B), a Base Transceiver Station (BTS), or a Mobile Multihop Relay (MMR)-BS and may include all or some of the functions of the AP, the RAS, the Node B, the BTS, or the MMR-BS.

Furthermore, in this specification, the term 'transmit' covers a concept of unicast, a concept of multicast, and a concept of broadcast.

The structures of an MBS carrier according to various embodiments of the present invention are described below with reference to FIGS. 1 to 7.

FIG. 1 shows the structure of an MBS carrier according to an embodiment of the present invention.

In FIG. 1, a carrier for MBS transmission corresponds to a dedicated carrier, and the dedicated carrier, together with a primary carrier, is shown for the sake of convenience.

Data transmitted in a primary carrier and data transmitted in a dedicated carrier are temporally divided for every superframe. The superframe includes a plurality of frames. In the dedicated carrier, a plurality of superframes forms an MBS scheduling interval (MSI).

The data transmitted in the dedicated carrier may be divided into a plurality of subbands on the frequency axis. All the plurality of subbands may be allocated to an MBS region. Furthermore, the plurality of subbands may be allocated to an MBS region and an unused region. Each region includes at least one subband.

Meanwhile, the MBS region in an MSI may be divided into a plurality of MBS zones on the frequency axis. Each MBS zone includes at least one subband. In each MBS zone, an MBS map is transmitted in the beginning of an MSI including a plurality of superframes.

In FIG. 1, the dedicated carrier includes three MBS zones.

Although an MBS transmitting apparatus uses an MBS carrier, such as that of FIG. 1, an MBS receiving apparatus having one transceiver receives only non-MBS data or only MBS data in a specific time interval because it has to receive non-MBS data and MBS data through carrier switching.

Accordingly, an MBS transmitting apparatus needs to perform scheduling in order to transmit non-MBS data and MBS data. However, since the MBS data is transmitted to a plurality of MBS receiving apparatuses, the structure of the MBS transmitting apparatus for scheduling the plurality of MBS receiving apparatuses may become complicated.

More particularly, each MBS zone extends over all the superframes of an MSI. If an MBS receiving apparatus needs to receive data in all the intervals of a specific MBS zone, the MBS receiving apparatus cannot receive non-MBS data in a corresponding MSI.

Figure 2:
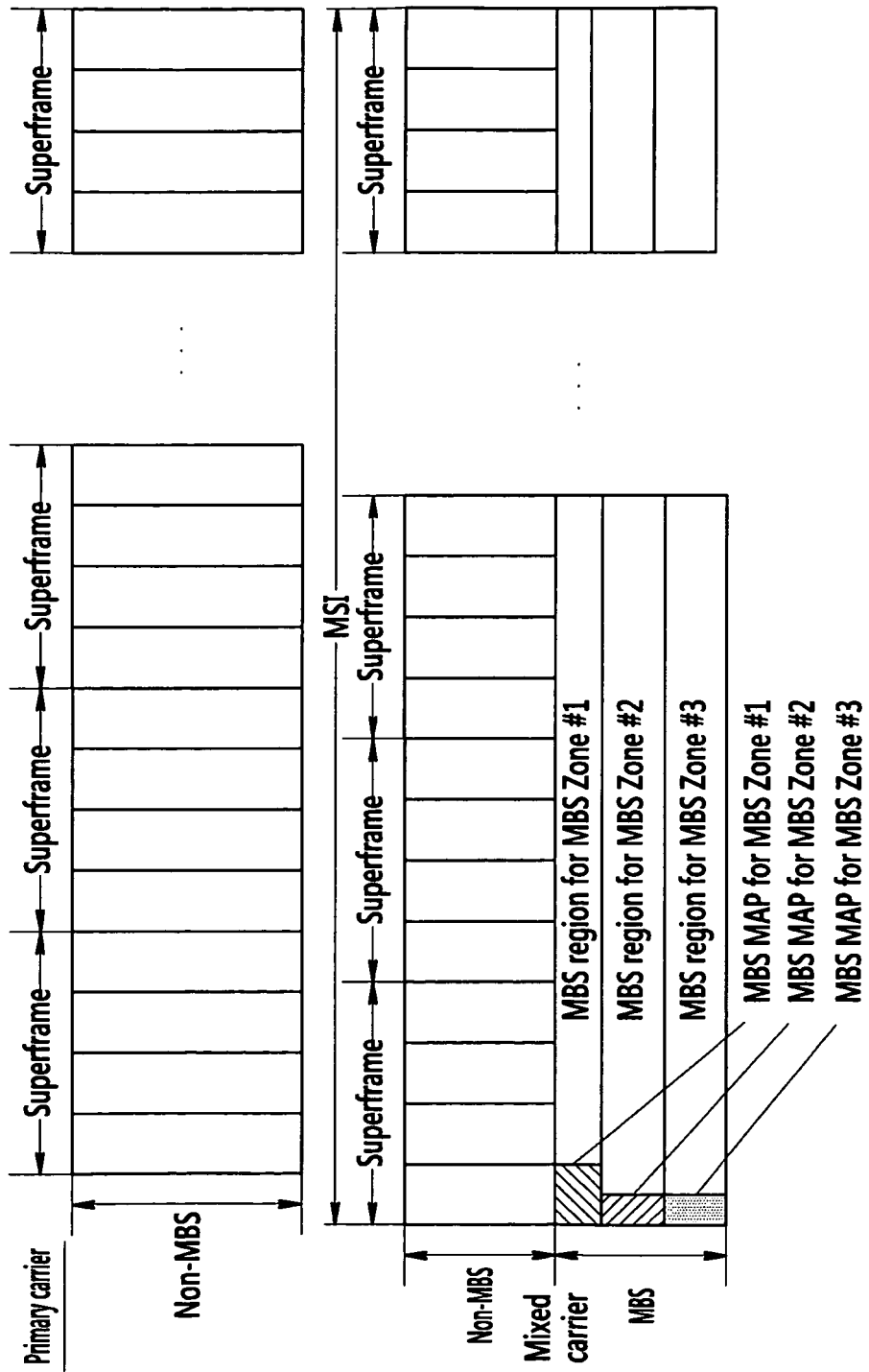
FIG. 2 shows the structure of an MBS carrier according to another embodiment of the present invention.

FIG. 2 shows the structure of an MBS carrier according to another embodiment of the present invention.

In FIG. 2, a carrier for MBS transmission corresponds to a mixed carrier, and the mixed carrier, together with a primary carrier, is shown for the sake of convenience.

Data transmitted in a primary carrier and data transmitted in a mixed carrier are temporally divided for every superframe. The superframe includes a plurality of frames. In the mixed carrier, a plurality of superframes forms an MBS scheduling interval (MSI).

The data transmitted in the mixed carrier may be divided into a plurality of subbands on the frequency axis. All the plurality of subbands may be allocated to an MBS region. Furthermore, the plurality of subbands may be allocated to an MBS region and an unused region. Each region includes at least one subband.

Meanwhile, the MBS region the MSI may be divided into a plurality of MBS zones on the frequency axis. Each MBS zone includes at least one subband. In each MBS zone, an MBS map is transmitted in the beginning of an MSI including a plurality of superframes.

In FIG. 2, the mixed carrier includes three MBS zones and one non-MBS region.

Although an MBS transmitting apparatus uses a mixed carrier, such as that of FIG. 2, the bandwidth for allocating the non-MBS region of the mixed carrier to all MBS receiving apparatuses receiving the MBS data via the mixed carrier may be insufficient. Consequently, the structure of the MBS transmitting apparatus may be complicated because the MBS transmitting apparatus needs to transmit non-MBS data to some of the MBS receiving apparatuses through a carrier not the mixed carrier.

More particularly, each MBS zone extends over all the superframes of an MSI. Accordingly, if an MBS receiving apparatus needs to receive data in all the intervals of a specific MBS zone, the MBS receiving apparatus cannot receive non-MBS data in a corresponding MSI.

Figure 3:
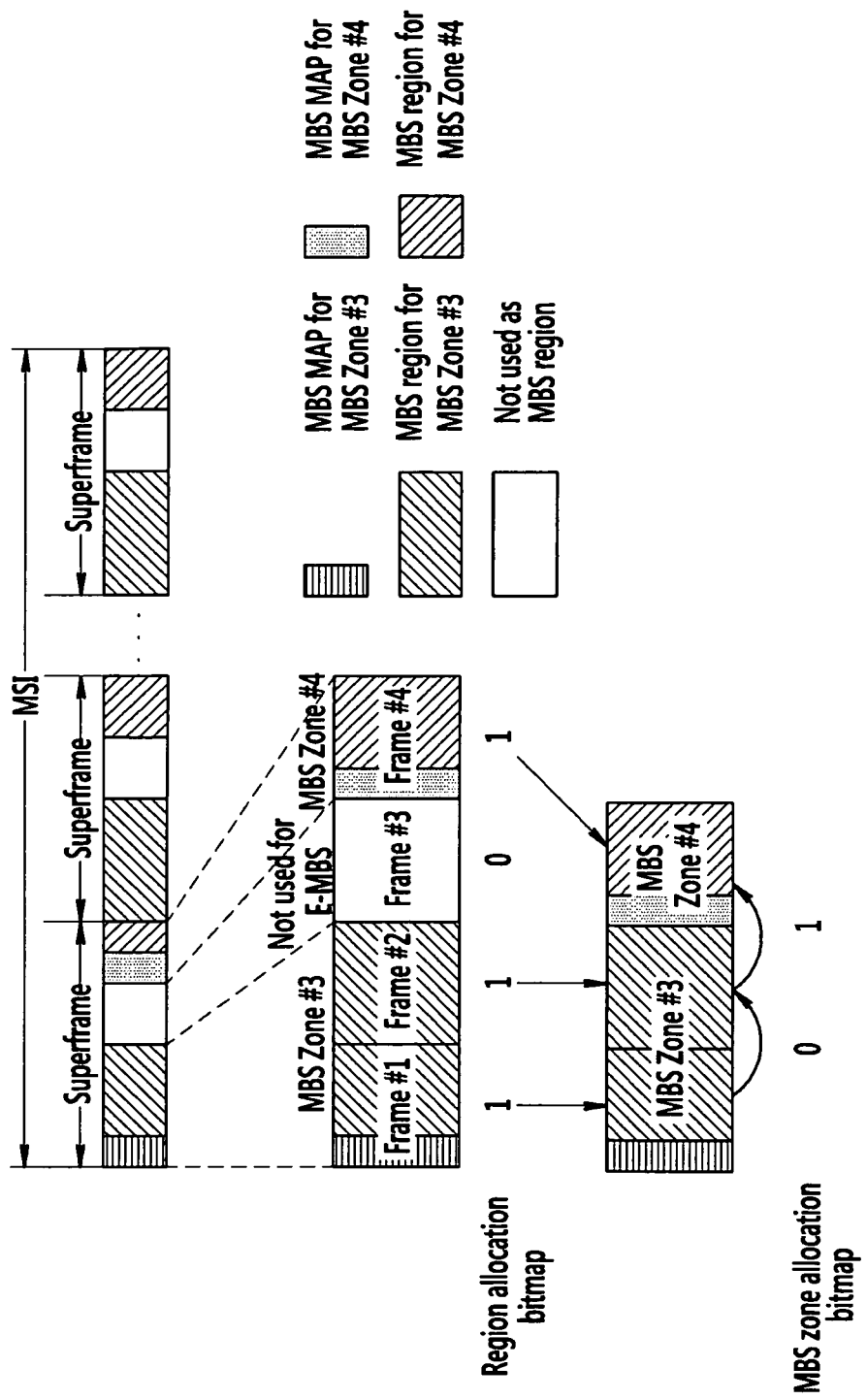
FIG. 3 shows the structure of an MBS carrier according to yet another embodiment of the present invention.

FIG. 3 shows the structure of an MBS carrier according to yet another embodiment of the present invention.

In FIG. 3, data transmitted through an MBS carrier is temporally divided for every superframe. The superframe includes a plurality of frames. In the MBS carrier, a plurality of the superframes forms an MSI.

All of a plurality of frames forming each superframe may be allocated to an MBS region. Furthermore, the plurality of frames may be allocated to an MBS region and a non-MBS region. Furthermore, the plurality of frames may be allocated to an MBS region and an unused region.

The frames allocated to the MBS region may be allocated to a plurality of MBS zones. Each MBS zone includes at least one frame.

An MBS map is transmitted in the beginning of the first frame of the plurality of frame forming each MBS zone within an MSI.

An MBS transmitting apparatus generates region allocation information in order to transmit allocation information of an MBS region and a non-MBS region to an MBS receiving apparatus and generates MBS zone allocation information different from the region allocation information in order to transmit allocation information of an MBS zone to an MBS receiving apparatus.

Each of the region allocation information and the MBS zone allocation information according to an embodiment of the present invention is a bitmap including a plurality of bits.

The number of bits of the region allocation bitmap is identical with the number of frames forming a subframe, and the plurality of bits corresponds to a plurality of the frames, respectively. Each bit of the region allocation bitmap indicates whether a corresponding frame is allocated to an MBS region or is allocated to an non-MBS region. In an embodiment of the present invention, a bit set to "1" indicates whether a corresponding frame is allocated to an MBS region, and a bit set to "0" indicates whether a corresponding frame is allocated to a non-MBS region.

The number of bits of the MBS zone allocation bitmap is identical with the number in which 1 has been subtracted from the number of frames allocated to an MBS region within each superframe within an MSI. The plurality of bits of an MBS zone allocation bitmap corresponds to the respective remaining frames other than the first frame from among frames allocated to an MBS region within each superframe. Each bit of the MBS zone allocation bitmap indicates whether a corresponding frame is allocated to the same MBS zone as that allocated by the previous frame. In an embodiment of the present invention, a bit set to "0" indicates whether a corresponding frame is allocated to the same MBS zone as that allocated by the previous frame, and a bit set to "1" indicates whether a corresponding frame is allocated to a different MBS zone from a previous frame. Consequently, the number in which 1 has been added to the number of bits set to "1" indicates the number of MBS zones.

As shown in FIG. 3, each superframe within an MSI includes four frames. The first, the second, and the fourth frames of each superframe are allocated to an MBS region, the third frame of each superframe is allocated to a non-MBS region, the first and the second frames of each superframe are allocated to an MBS zone #3, and the fourth frame of each superframe is allocated to an MBS zone #4. If each frame includes one or more downlink subframes and one or more uplink subframes, the downlink subframe of each frame may be allocated to the MBS region.

Accordingly, a region allocation bitmap for one MSI shown in FIG. 3 corresponds to "1101," and an MBS zone allocation bitmap therefore corresponds to "01."

As described above, since the MBS region and the non-MBS region are allocated to different time intervals and there is time interval in which MBS data is not transmitted, an MBS transmitting apparatus can easily schedule MBS data and non-MBS data.

Furthermore, according to the embodiment of FIG. 3, the plurality of MBS zones is allocated to different time intervals within the MSI. In order to transmit non-MBS data to an MBS receiving apparatus that receives only some MBS zones, the time intervals of the remaining MBS zones can be used. Accordingly, the MBS transmitting apparatus can easily schedule MBS data and non-MBS data.

Both the region allocation information and the MBS zone allocation information for an MBS carrier according to an embodiment of the present invention can be transmitted through a system information message by means of an MBS transmitting apparatus. The system information message is a message that an MBS receiving apparatus periodically broadcasts system configuration information for receiving the data of a non-MBS region, and it may correspond to a system configuration descriptor (SCD) message.

Meanwhile, the MBS zone allocation information for an MBS carrier according to an embodiment of the present invention is information necessary for only an MBS receiving apparatus that receives MBS. The MBS zone allocation information can be transmitted by an MBS transmitting apparatus through an MBS-specific message, such as an MBS configuration (MBS-CFG) message. The MBS-CFG message includes MBS configuration information necessary for the MBS operation of an MBS receiving apparatus, and it is broadcast by an MBS transmitting apparatus.

Figure 4:
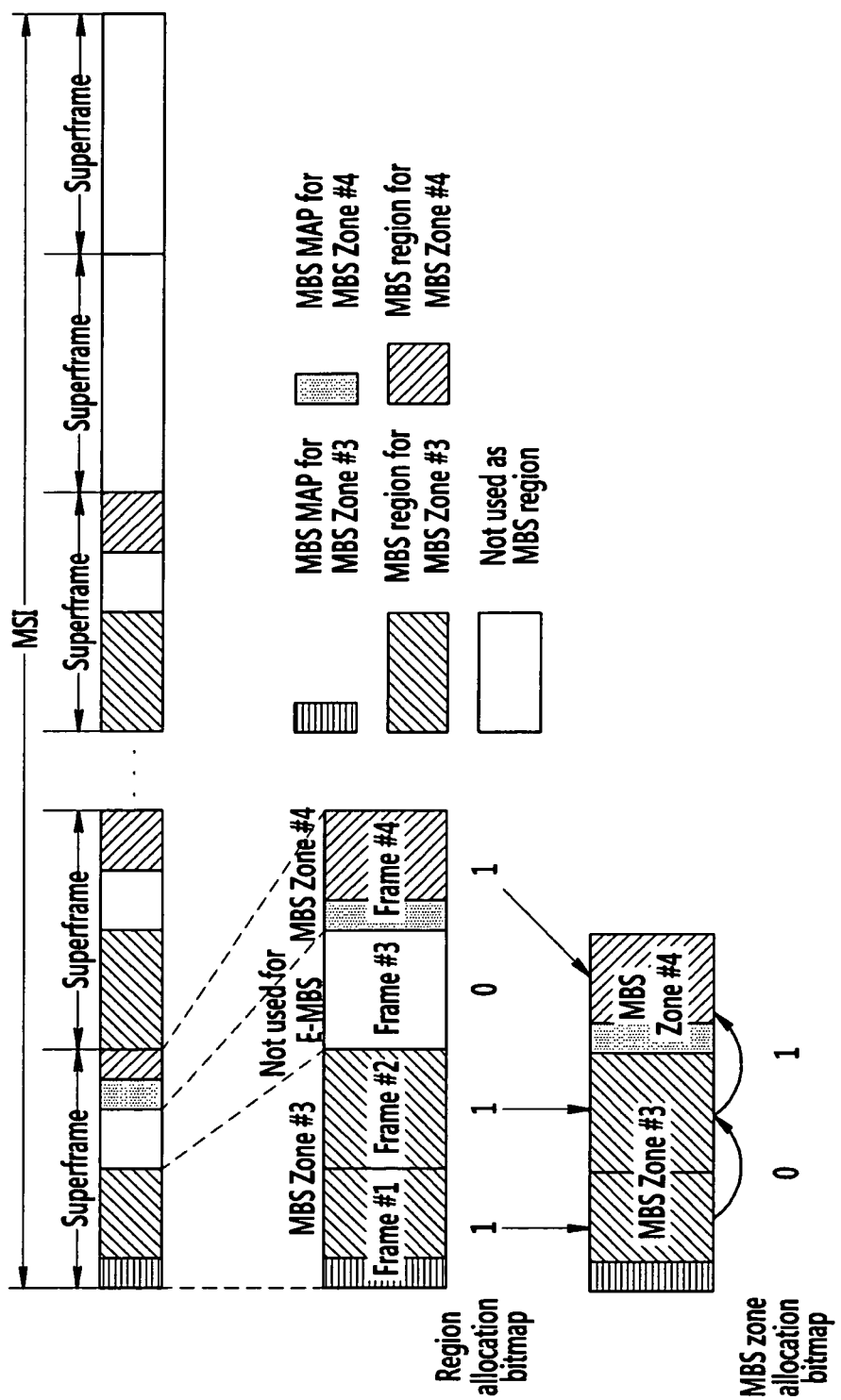
FIG. 4 shows the structure of an MBS carrier according to further yet another embodiment of the present invention.

FIG. 4 shows the structure of an MBS carrier according to further yet another embodiment of the present invention.

The structure of the MBS carrier shown in FIG. 4 is basically similar to the structure of the MBS carrier shown in FIG. 3.

However, an MBS transmitting apparatus may transmit information of a range in which region allocation and MBS zone allocation are valid within an MSI to an MBS receiving apparatus.

For example, assuming that an MSI includes 16 superframes, when an MBS transmitting apparatus transmits information, indicating that region allocation and MBS zone allocation are valid from the first superframe to the fourteenth superframe within the MSI, to an MBS receiving apparatus, all frames within the fifteenth and the sixteenth superframes correspond to a non-MBS region.

Figure 5:
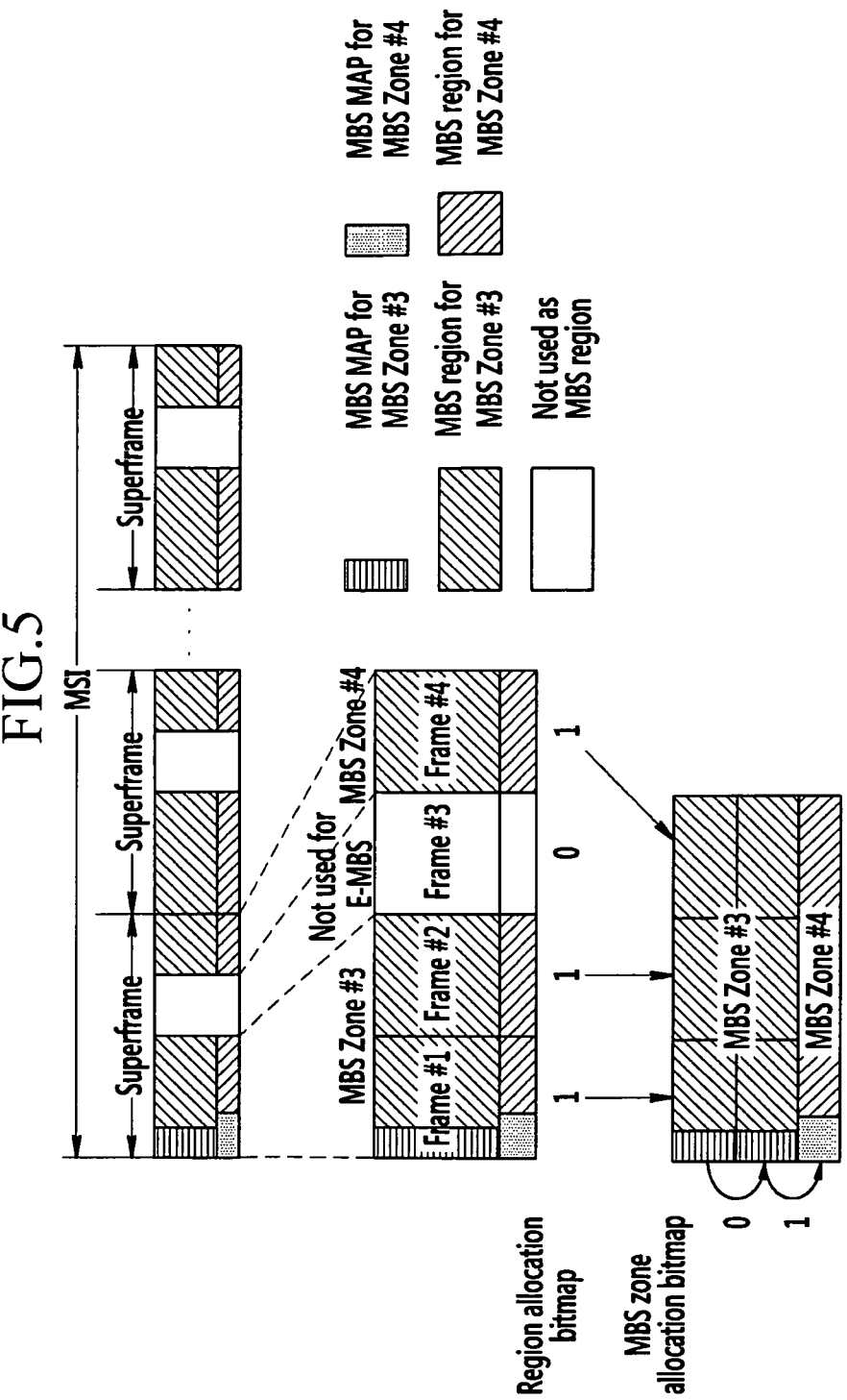
FIG. 5 shows the structure of an MBS carrier according to still yet another embodiment of the present invention.

FIG. 5 shows the structure of an MBS carrier according to still yet another embodiment of the present invention.

In FIG. 5, data transmitted through an MBS carrier is temporally divided for every superframe. The superframe includes a plurality of frames. In the MBS carrier, the plurality of a superframe forms an MSI.

All of a plurality of frames forming each superframe may be allocated to an MBS region. Furthermore, the plurality of frames may be allocated to an MBS region and a non-MBS region. Furthermore, the plurality of frames may be allocated to an MBS region and an unused region. If each frame includes one or more downlink subframes and one or more uplink subframes, the downlink subframes of each frame may be allocated to an MBS region.

The frames allocated to the MBS region may be allocated to a plurality of MBS zones. Data transmitted through an MBS carrier may be divided into a plurality of subbands on the frequency axis. Each MBS zone includes at least one frame.

An MBS map is transmitted in the beginning of subbands forming each MBS zone within an MSI.

An MBS transmitting apparatus generates region allocation information in order to transmit allocation information of an MBS region and a non-MBS region to an MBS receiving apparatus and generates MBS zone allocation information different from the region allocation information in order to transmit allocation information of an MBS zone to an MBS receiving apparatus.

Each of the region allocation information and the MBS zone allocation information according to an embodiment of the present invention is a bitmap including a plurality of bits.

The number of bits of the region allocation bitmap is identical with the number of frames forming a subframe, and the plurality of bits corresponds to a plurality of the frames, respectively. Each bit of the region allocation bitmap indicates whether a corresponding frame is allocated to an MBS region or is allocated to an non-MBS region. In an embodiment of the present invention, a bit set to "1" indicates whether a corresponding frame is allocated to an MBS region, and a bit set to "0" indicates whether a corresponding frame is allocated to a non-MBS region.

The number of bits of the MBS zone allocation bitmap is identical with the number in which 1 has been subtracted from the number of subbands forming an MBS carrier. The plurality of bits of the MBS zone allocation bitmap corresponds to the respective remaining subbands other the first subband, from among a plurality of subbands. Each bit of the MBS zone allocation bitmap indicates whether a corresponding subband is allocated to the same MBS zone as that allocated by the previous subband. In an embodiment of the present invention, a bit set to "0" indicates whether a corresponding subband is allocated to the same MBS zone as that allocated by the previous subband, and a bit set to "1" indicates whether a corresponding subband is allocated to a different MBS zone from a previous subband. Consequently, the number in which 1 has been added to the number of bits set to "1" indicates the number of MBS zones.

As shown in FIG. 5, each superframe within the MSI includes four frames. The first, the second, and the fourth frames of each superframe are allocated to an MBS region, and the third frame of each superframe is allocated to a non-MBS region. An MBS carrier includes three subbands, the first and the second subbands of the three subbands are allocated to an MBS zone #3, and the third subband of the three subbands is allocated to an MBS zone #4.

Accordingly, a region allocation bitmap for one MSI shown in FIG. 5 corresponds to "1101," and an MBS zone allocation bitmap therefore corresponds to "01."

As described above, since the MBS region and the non-MBS region are allocated to different time intervals and there is time interval in which MBS data is not transmitted, an MBS transmitting apparatus can easily schedule MBS data and non-MBS data.

Figure 6:
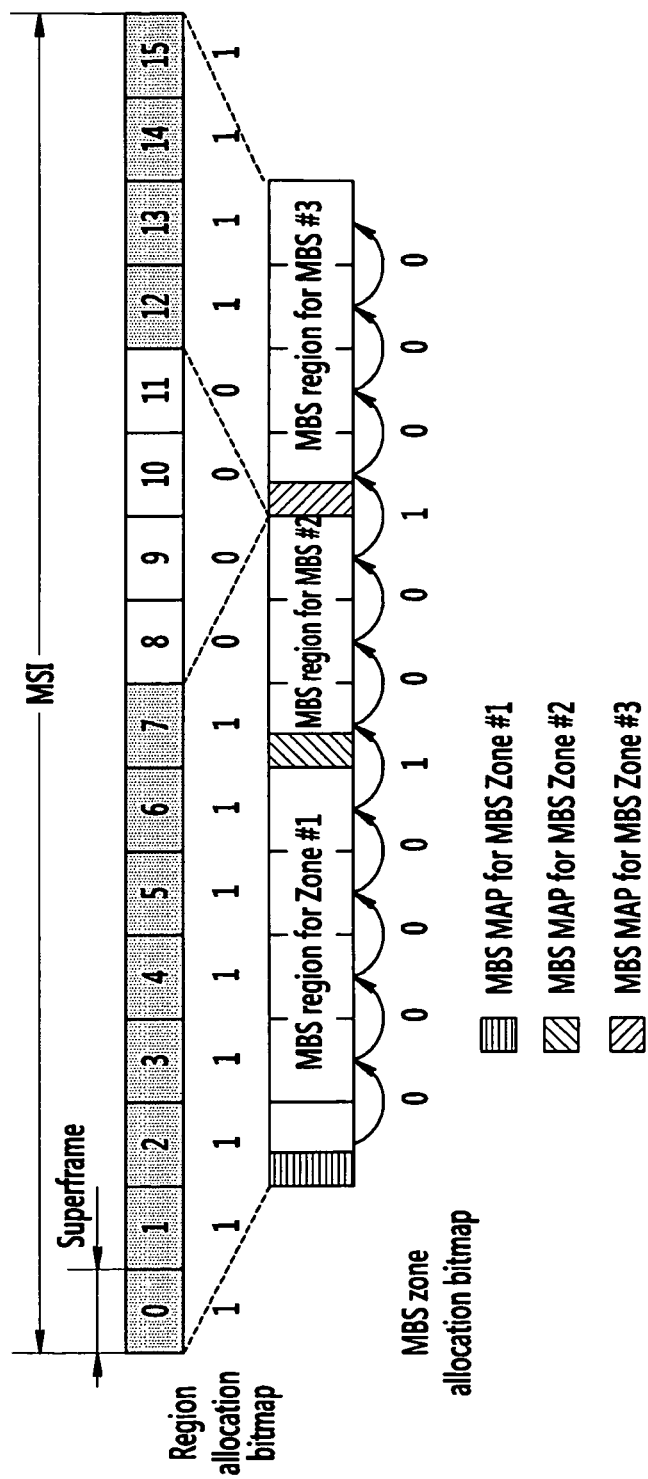
FIG. 6 shows the structure of an MBS carrier according to still yet another embodiment of the present invention.

FIG. 6 shows the structure of an MBS carrier according to still yet another embodiment of the present invention.

As shown in FIG. 6, one MSI of an MBS carrier includes a plurality of superframes, and the plurality of superframes within the MSI may be allocated to an MBS region and a non-MBS region.

The plurality of superframes allocated to the MBS region may be allocated to a plurality of MBS zones. Each MBS zone includes at least one superframe.

An MBS map is transmitted in the beginning of the plurality of superframes forming each MBS zone.

An MBS transmitting apparatus generates region allocation information in order to transmit allocation information of an MBS region and a non-MBS region to an MBS receiving apparatus and generates MBS zone allocation information different from the region allocation information in order to transmit allocation information of an MBS zone to an MBS receiving apparatus.

Each of the region allocation information and the MBS zone allocation information according to an embodiment of the present invention is a bitmap including a plurality of bits.

The number of bits of the region allocation bitmap is identical with the number of superframes forming an MSI, and the plurality of bits corresponds to the plurality of superframes, respectively. Each bit of the region allocation bitmap indicates whether a corresponding superframe is allocated to an MBS region or to a non-MBS region. In an embodiment of the present invention, a bit set to "1" indicates that a corresponding superframe is allocated to the MBS region, and a bit set to "0" indicates that a corresponding superframe is allocated to the non-MBS region.

The number of bits of the MBS zone allocation bitmap is identical with the number in which 1 has been subtracted from the number of superframes allocated to the MBS region within the MSI. The plurality of bits of the MBS zone allocation bitmap corresponds to the respective remaining superframes other than the first superframe from among the plurality of superframes allocated to the MBS region within the MSI. Each bit of the MBS zone allocation bitmap indicates whether a corresponding superframe is allocated to the same MBS zone as that allocated by the previous superframe. In an embodiment of the present invention, a bit set to "0" indicates that a corresponding superframe is allocated to the same MBS zone as that allocated by the previous superframe, and a bit set to "1" indicates that a corresponding superframe is allocated to a different MBS zone from that allocated by the previous superframe. Consequently, the number in which 1 has been added to a bit set to "1" indicates the number of MBS zones.

As shown in FIG. 6, the MSI includes 16 superframes. The superframes 0, 1, 2, 3, 4, 5, 6, 7, 12, 13, 14, and 15 are assumed to be allocated to the MBS region, the superframes 8, 9, 10, and 11 are assumed to be allocated to the non-MBS region, the superframes 0, 1, 2, 3, and 4 are assumed to be allocated to the MBS zone #1, the superframes 5, 6, and 7 are assumed to be allocated to the MBS zone #2, and the superframes 12, 13, 14, and 15 are assumed to be allocated to the MBS zone #3.

Accordingly, the region allocation bitmap for one MSI shown in FIG. 6 corresponds to "1111111100001111," and the MBS zone allocation bitmap therefore corresponds to "00001001000."

As described above, since the MBS region and the non-MBS region are allocated to different time intervals within the MSI and there is a time interval in which MBS data is not transmitted, an MBS transmitting apparatus can easily schedule MBS data and non-MBS data.

Furthermore, according to the embodiment of FIG. 6, the plurality of MBS zones is allocated to different time intervals within the MSI. In order to transmit non-MBS data to an MBS receiving apparatus that receives only some MBS zones, the time intervals of the remaining MBS zones can be used. Accordingly, an MBS transmitting apparatus can easily schedule MBS data and non-MBS data.

Figure 7:
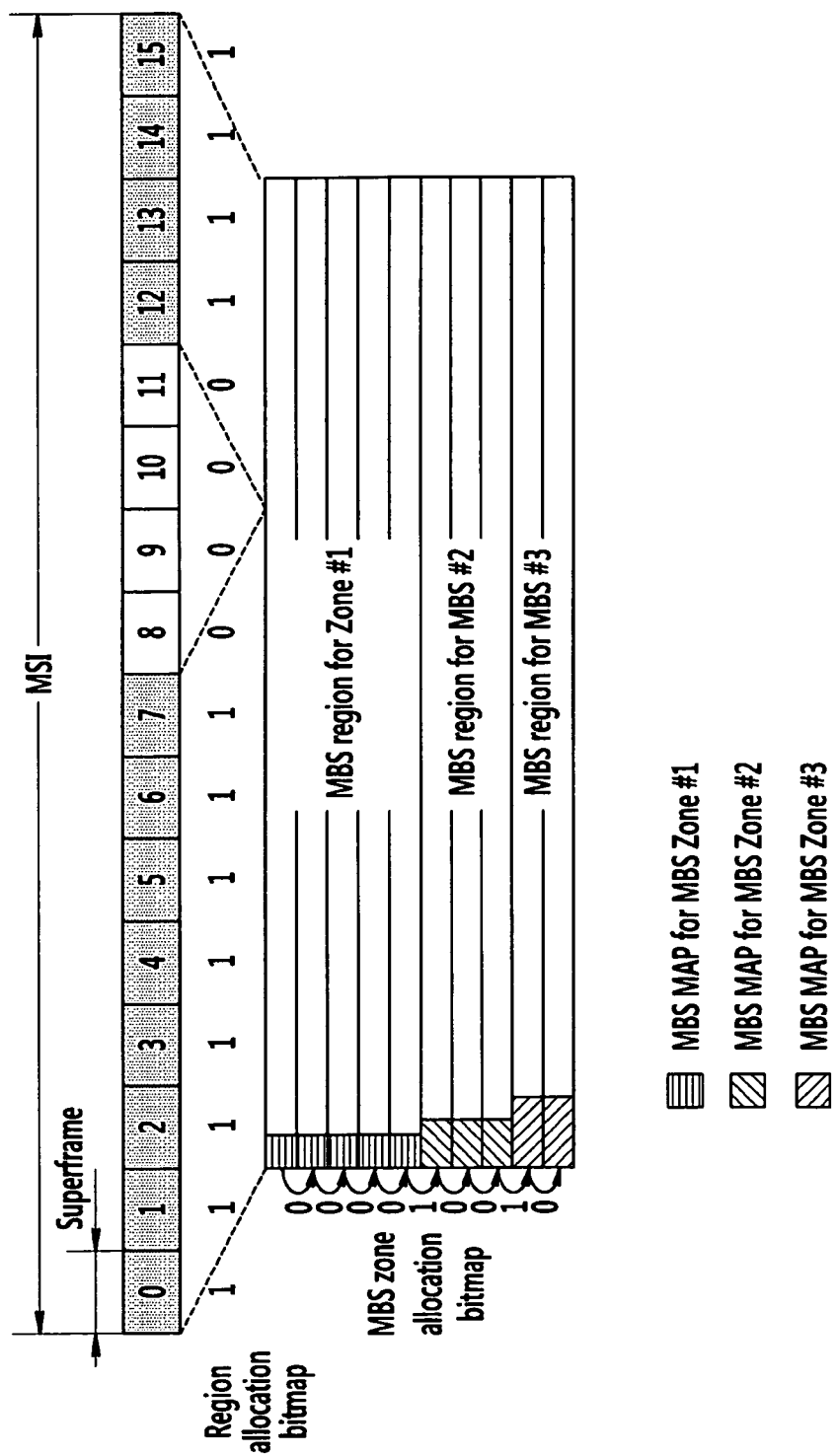
FIG. 7 shows the structure of an MBS carrier according to still yet another embodiment of the present invention.

FIG. 7 shows the structure of an MBS carrier according to still yet another embodiment of the present invention.

As shown in FIG. 7, one MSI of an MBS carrier includes a plurality of superframes. The plurality of superframes within the MSI may be allocated to an MBS region and a non-MBS region.

The plurality of superframes allocated to the MBS region may be allocated to a plurality of MBS zones. Data transmitted through an MBS carrier may be divided into a plurality of subbands on the frequency axis. Each MBS zone includes at least one subband.

An MBS map is transmitted in the beginning of a plurality of subbands forming each of the MBS zones within the MSI.

An MBS transmitting apparatus generates region allocation information in order to transmit allocation information of an MBS region and a non-MBS region to an MBS receiving apparatus and generates MBS zone allocation information different from the region allocation information in order to transmit allocation information of an MBS zone to an MBS receiving apparatus.

Each of the region allocation information and the MBS zone allocation information according to an embodiment of the present invention is a bitmap including a plurality of bits.

The number of bits of the region allocation bitmap is identical with the number of superframes forming an MSI, and the plurality of bits corresponds to the plurality of superframes, respectively. Each bit of the region allocation bitmap indicates whether a corresponding superframe is allocated to an MBS region or to a non-MBS region. In an embodiment of the present invention, a bit set to "1" indicates that a corresponding superframe is allocated to the MBS region, and a bit set to "0" indicates that a corresponding superframe is allocated to the non-MBS region.

The number of bits of the MBS zone allocation bitmap is identical with the number in which 1 has been subtracted from the number of a plurality of subbands forming an MBS carrier. The plurality of bits of the MBS zone allocation bitmap corresponds to the respective remaining subbands other than the first subband from among the plurality of subbands. Each bit of the MBS zone allocation bitmap indicates whether a corresponding subband is allocated to the same MBS zone as that allocated by the previous subband. In an embodiment of the present invention, a bit set to "0" indicates that a corresponding subband is allocated to the same MBS zone as that allocated by the previous subband, and a bit set to "1" indicates that a corresponding subband is allocated to a different MBS zone from that allocated by the previous subband. Consequently, the number in which 1 has been added to a bit set to "1" indicates the number of MBS zones.

As shown in FIG. 7, the MSI includes 16 subbands. The subbands 0, 1, 2, 3, 4, 5, 6, 7, 12, 13, 14, and 15 are assumed to be allocated to the MBS region, the subbands 8, 9, 10, and 11 are assumed to be allocated to the non-MBS region, the first subband to the fifth subband are assumed to be allocated to the MBS zone #1, the sixth subband to the eighth subband are assumed to be allocated to the MBS zone #2, and the ninth subband to the tenth subband are assumed to be allocated to the MBS zone #3.

Accordingly, the region allocation bitmap for one MSI shown in FIG. 7 corresponds to "1111111100001111," and the MBS zone allocation bitmap therefore corresponds to "00001001000."

As described above, since the MBS region and the non-MBS region are allocated to different time intervals within the MSI and there is a time interval in which MBS data is not transmitted, an MBS transmitting apparatus can easily schedule MBS data and non-MBS data.

Figure 8:
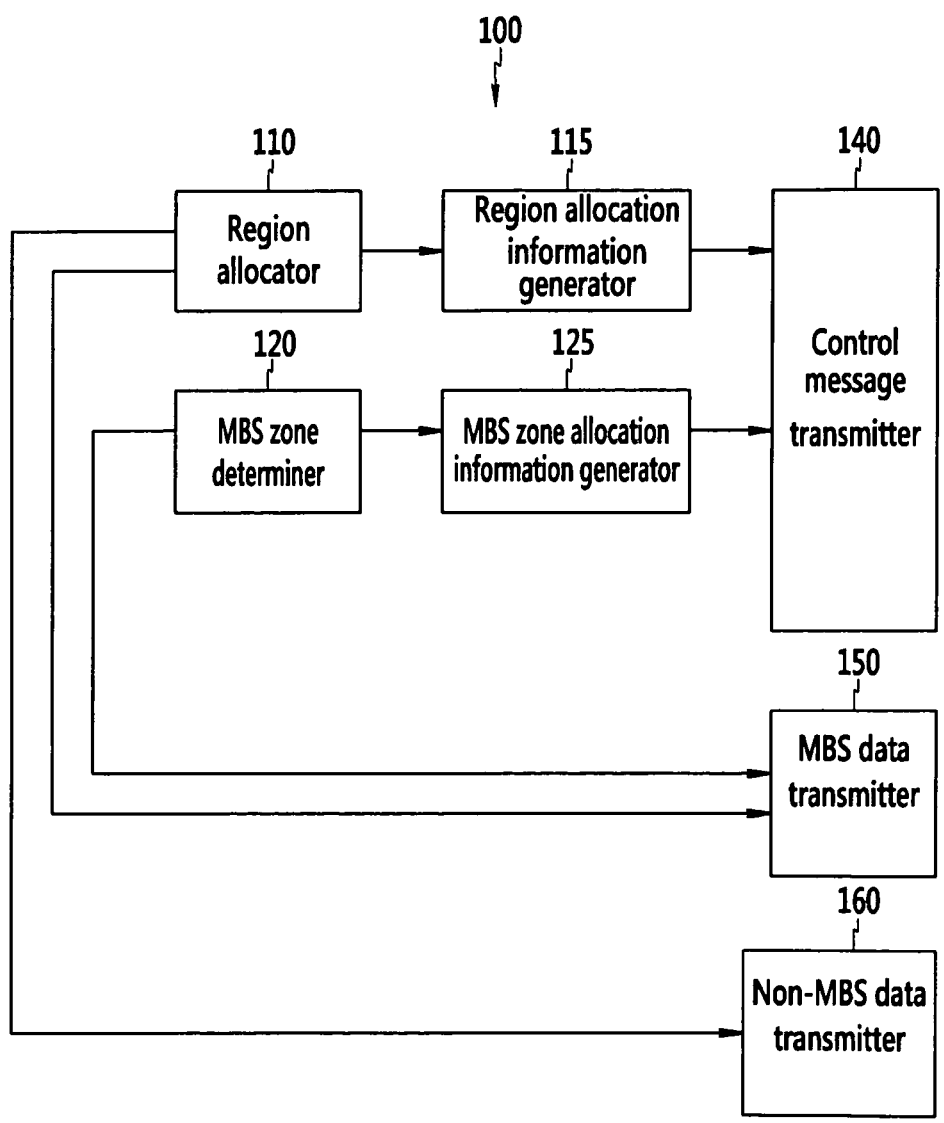
FIG. 8 is a block diagram showing the construction of an MBS transmitting apparatus according to an embodiment of the present invention.

FIG. 8 is a block diagram showing the construction of an MBS transmitting apparatus according to an embodiment of the present invention.

As shown in FIG. 8, the MBS transmitting apparatus 100 includes a region allocator 110, a region allocation information generator 115, an MBS zone determiner 120, an MBS zone allocation information generator 125, a control message transmitter 140, an MBS data transmitter 150, and a non-MBS data transmitter 160. The operations of the constituent elements of the MBS transmitting apparatus 100 according to the embodiment of the present invention are described below with reference to FIG. 9.

Figure 9:
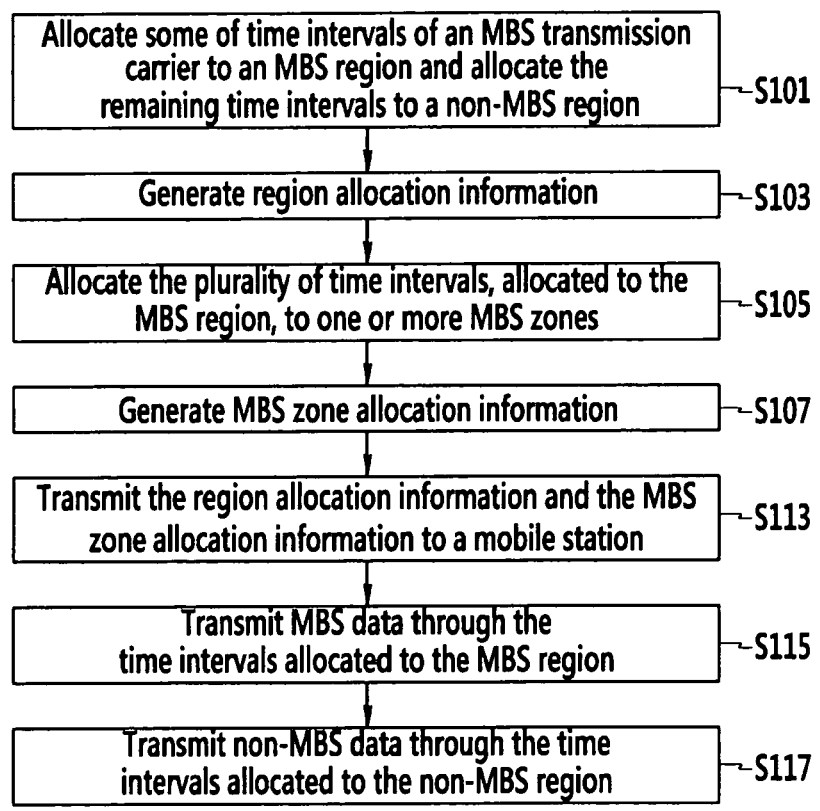
FIG. 9 is a flowchart illustrating the operation of the MBS transmitting apparatus according to an embodiment of the present invention.

FIG. 9 is a flowchart illustrating the operation of the MBS transmitting apparatus according to an embodiment of the present invention.

The region allocator 110 allocates some of a plurality of time intervals of an MBS transmission carrier to an MBS region and allocates the remaining time intervals to a non-MBS region at step S101. Here, the time interval may correspond to a superframe, a frame, a subframe, or a slot.

The region allocation information generator 115 generates region allocation information, such as that described with reference to FIGS. 3 to 7 at step S103.

The MBS zone allocator 120 allocates the plurality of time intervals, allocated to the MBS region, to one or more MBS zones at step S105. The MBS zone allocator 120 may allocate each plurality of time intervals, allocated to the MBS region, to one of the plurality of MBS zones. Furthermore, the MBS zone allocator 120 may allocate each plurality of subbands to one of the plurality of MBS zones within the plurality of time intervals allocated to the MBS region.

The MBS zone allocation information generator 125 generates MBS zone allocation information, such as that described with reference to FIGS. 3 to 7 at step S107.

The control message transmitter 140 transmits the region allocation information and the MBS zone allocation information to an MBS receiving apparatus at step S113. The region allocation information and the MBS zone allocation information may be transmitted through different control messages or may be transmitted through one control message. Both the region allocation information and the MBS zone allocation information may be transmitted through a system information message. The region allocation information may be transmitted through a system information message or through an MBS-specific message.

The MBS data transmitter 150 multicasts or broadcasts MBS data through the time intervals allocated to the MBS region at step S115. More particularly, the MBS data transmitter 150 transmits MBS data for each MBS zone through the time intervals or subbands allocated to a corresponding MBS zone.

The non-MBS data transmitter 160 transmits non-MBS data through the time intervals allocated to the non-MBS region at step S117.

Figure 10:
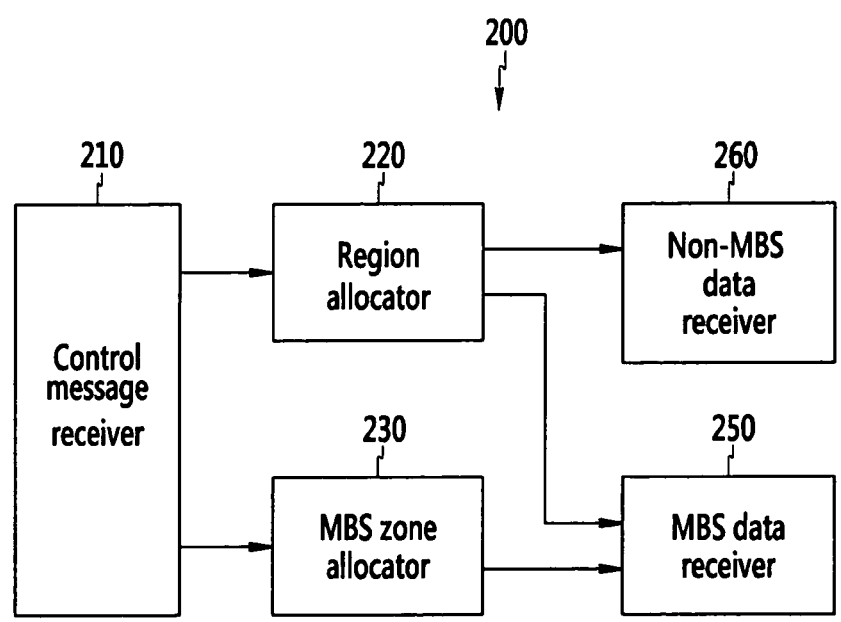
FIG. 10 is a block diagram showing the construction of an MBS receiving apparatus according to an embodiment of the present invention.

FIG. 10 is a block diagram showing the construction of an MBS receiving apparatus according to an embodiment of the present invention.

As shown in FIG. 10, the MBS receiving apparatus 200 includes a control message receiver 210, a region allocator 220, an MBS zone allocator 230, an MBS data receiver 250, and a non-MBS data receiver 260.

The operations of the constituent elements of the MBS receiving apparatus 200 according to the embodiment of the present invention are described with reference to FIG. 11.

Figure 11:
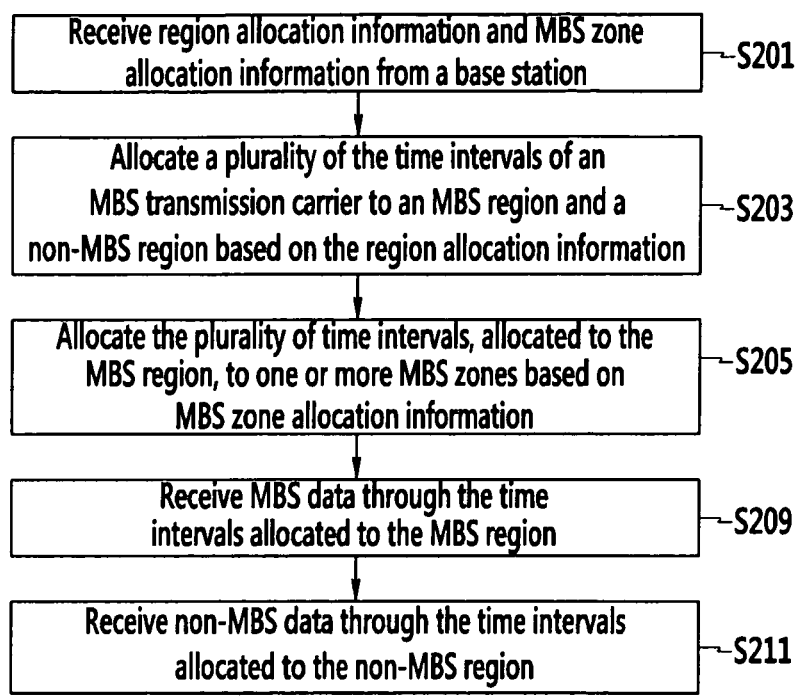
FIG. 11 is a flowchart illustrating the operation of the MBS receiving apparatus according to an embodiment of the present invention.

FIG. 11 is a flowchart illustrating the operation of the MBS receiving apparatus according to an embodiment of the present invention.

The control message receiver 210 receives region allocation information and MBS zone allocation information from an MBS transmitting apparatus at step S201.

The region allocator 220 allocates a plurality of the time intervals of an MBS transmission carrier to an MBS region and a non-MBS region based on region allocation information received as described above with reference to FIGS. 3 to 7 at step S203.

The MBS zone allocator 230 allocates the plurality of time intervals, allocated to the MBS region, to one or more MBS zones based on MBS zone allocation information received as described above with reference to FIGS. 3 to 7 at step S205.

The MBS data receiver 250 receives MBS data through the time intervals allocated to the MBS region at step S209. More particularly, the MBS data receiver 250 receives MBS data for each MBS zone through time intervals or subbands allocated to a corresponding MBS zone.

The non-MBS data receiver 260 receives non-MBS data through time intervals allocated to the non-MBS region at step S211.

As described above, an MBS transmitting apparatus allocates each time interval of an MBS transmission carrier to an MBS region and a non-MBS region. Accordingly, an MBS transmitting apparatus can easily schedule MBS data and non-MBS data because there is a time interval in which MBS data is not transmitted within an MSI.

Furthermore, an MBS transmitting apparatus allocates each of time intervals, allocated to an MBS region, to each MBS zone. Accordingly, the time intervals of the remaining MBS zones can be used in order to transmit non-MBS data to an MBS receiving apparatus that receives only some MBS zones. An MBS transmitting apparatus can easily schedule MBS data and non-MBS data.

Furthermore, an MBS transmitting apparatus transmits region allocation information, indicating whether each time interval is allocated to an MBS region or a non-MBS region. Accordingly, waste of the bandwidth can be prevented because time intervals corresponding to unsupported MBS zones can be allocated to a non-MBS region.

Furthermore, an MBS transmitting apparatus can transmit clear information of a less amount of bits to an MBS receiving apparatus by transmitting a bitmap as region allocation information and MBS zone allocation information.

According to an embodiment of the present invention, an MBS transmitting apparatus may become a base station or a relay station, and an MBS receiving apparatus may become a mobile station.

The above embodiments of the present invention are not implemented by only a method and an apparatus, but may be implemented using a program for realizing a function corresponding to the construction of the embodiment of the present invention or a recording medium on which the program is recorded. The implementation can be easily achieved by those having ordinary skill in the art to which the present invention pertains from the above embodiment.

While this invention has been described in connection with what is presently considered to be practical embodiments, it is to be understood that the invention is not limited to the disclosed embodiments, but, on the contrary, is intended to cover various modifications and equivalent arrangements included within the spirit and scope of the appended claims.

What is claimed is:

1. A method of transmitting multicast broadcast service (MBS) data in an MBS transmitting apparatus, the method comprising:
 allocating a plurality of time intervals of an MBS transmission carrier to an MBS region and a non-MBS region;
 generating region allocation information of the MBS region and the non-MBS region;
 allocating time intervals allocated to the MBS region to one or more MBS zones;
 generating MBS zone allocation information of the one or more MBS zones;
 transmitting the region allocation information and the MBS zone allocation information; and
 transmitting MBS data through the time intervals allocated to the MBS region,
 wherein the region allocation information indicates whether each time interval is allocated to the MBS region or to the non-MBS region.

2. The method of claim 1, wherein the region allocation information comprises a first bitmap including a plurality of bits corresponding to the plurality of time intervals, and
 each bit of the first bitmap indicates whether a corresponding time interval is allocated to the MBS region or to the non-MBS region.

3. The method of claim 2, wherein allocating the time intervals allocated to the MBS region to one or more MBS zones comprises allocating the time intervals allocated to the MBS region to the one or more MBS zones, respectively, and
 the MBS zone allocation information indicates whether each time interval allocated to the MBS region is allocated to which MBS zone.

4. The method of claim 3, wherein the MBS zone allocation information comprises a second bitmap including a plurality of bits corresponding to remaining time intervals other than the first time interval, among the time intervals allocated to the MBS region, and
 each bit of the second bitmap indicates whether a corresponding time interval is allocated to the same MBS region as that allocated by the previous time interval.

5. The method of claim 2, wherein allocating the time intervals allocated to the MBS region to one or more MBS zones comprises allocating a plurality of subbands within the time intervals allocated to the MBS region to the one or more MBS zones, and the MBS zone allocation information indicates whether each subband is allocated to which MBS zone.

6. The method of claim 5, wherein the MBS zone allocation information comprises a second bitmap including a plurality of bits corresponding to remaining subbands other than the first time interval, among the subbands allocated to the MBS region, and
 each bit of the second bitmap indicates whether a corresponding subband is allocated to the same MBS region as that allocated by the previous subband.

7. The method of claim 2, further comprising:
 transmitting non-MBS data through time intervals allocated to the non-MBS region.

8. The method of claim 2, wherein the non-MBS region corresponds to an unused region.

9. The method of claim 2, wherein the region allocation information is broadcasted through a system information message, and
 the MBS zone allocation information is broadcasted through an MBS-specific message.

10. An MBS transmitting apparatus, the apparatus comprising:
 a region allocator configured to allocate a plurality of time intervals of an MBS transmission carrier to an MBS region and a non-MBS region;
 a region allocation information generator configured to generate region allocation information of the MBS region and the non-MBS region;

an MBS zone allocator configured to allocate time intervals allocated to the MBS region to one or more MBS zones;
an MBS zone allocation information generator configured to generate MBS zone allocation information of the one or more MBS zones;
a control data transmitter configured to transmit the region allocation information and the MBS zone allocation information; and
an MBS data transmitter configured to transmit MBS data through time intervals allocated to the MBS region,
wherein the region allocation information indicates whether each time interval is allocated to the MBS region or to the non-MBS region.

11. The apparatus of claim 10, wherein the region allocation information comprises a first bitmap including a plurality of bits corresponding to the plurality of time intervals, and
each bit of the first bitmap indicates whether a corresponding time interval is allocated to the MBS region or to the non-MBS region.

12. The apparatus of claim 11, wherein the MBS zone allocator allocates the time intervals allocated to the MBS region to the one or more MBS zones, respectively,
the MBS zone allocation information comprises a second bitmap including a plurality of bits corresponding to remaining time intervals other than the first time interval, among the time intervals allocated to the MBS region, and
each bit of the second bitmap indicates whether a corresponding time interval is allocated to the same MBS region as that allocate by the previous time interval.

13. The MBS transmitting apparatus of claim 11, wherein the MBS zone allocator allocates a plurality of subbands to the one or more MBS zones within the time intervals allocated to the MBS region,
the MBS zone allocation information comprises a second bitmap including a plurality of bits corresponding to remaining subbands other than the first subband, among the subbands allocated to the MBS region, and
each bit of the second bitmap indicates whether a corresponding subband is allocated to the same MBS region as that allocated by the previous subband.

14. A method of receiving MBS data in an MBS receiving apparatus, the method comprising:
receiving region allocation information of an MBS region and a non-MBS region;
allocating a plurality of time intervals of an MBS transmission carrier to the MBS region and the non-MBS region based on the region allocation information;
receiving MBS zone allocation information of the one or more MBS zones;
allocating time intervals allocated to the MBS region to one or more MBS zones based on the MBS zone allocation information; and
receiving MBS data through the time intervals allocated to the one or more MBS zones,
wherein the region allocation information indicates whether each plurality of time intervals is allocated to the MBS region or to the non-MBS region.

15. The method of claim 14, wherein the region allocation information comprises a first bitmap including a plurality of bits corresponding to the plurality of time intervals, and
each bit of the first bitmap indicates whether a corresponding time interval is allocated to the MBS region or to the non-MBS region.

16. The method of claim 15, wherein allocating the time intervals allocated to the MBS region to one or more MBS zones comprises allocating the time intervals allocated to the MBS region to the one or more MBS zones, respectively,
wherein the MBS zone allocation information comprises a second bitmap including a plurality of bits corresponding to remaining time intervals other than the first time interval, among the time intervals allocated to the MBS region, and
each bit of the second bitmap indicates whether a corresponding time interval is allocated to the same MBS zone as that allocated by the previous time interval.

17. The method of claim 15, wherein allocating the time intervals allocated to the MBS region to one or more MBS zones comprises allocating a plurality of subbands within the time intervals allocated to the MBS region to the one or more MBS zones,
wherein the MBS zone allocation information comprises a second bitmap including a plurality of bits corresponding to remaining subbands other than the first subband, among the subbands allocated to the MBS region, and
each bit of the second bitmap indicates whether a corresponding subband is allocated to an MBS region identical with an MBS region of a previous subband.

18. An MBS receiving apparatus, the apparatus comprising:
a control data receiver configured to receive region allocation information of an MBS region and a non-MBS region, and MBS zone allocation information of one or more MBS zones;
a region allocator configured to allocate a plurality of time intervals of an MBS transmission carrier to the MBS region and the non-MBS region based on the region allocation information;
an MBS zone allocator configured to allocate time intervals allocated to the MBS zone to the one or more MBS zones based on the MBS zone allocation information; and
an MBS data receiver configured to receive MBS data through the time intervals allocated to the one or more MBS zones,
wherein the region allocation information indicates whether each plurality of time intervals is allocated to the MBS region or to the non-MBS region.

19. The apparatus of claim 18, wherein the region allocation information comprises a first bitmap including a plurality of bits corresponding to the plurality of time intervals, and
each bit of the first bitmap indicates whether a corresponding time interval is allocated to the MBS region or to the non-MBS region,
wherein the MBS zone allocation information comprises a second bitmap including a plurality of bits corresponding to remaining time intervals other than the first time interval among the time intervals allocated to the MBS region, and
each bit of the second bitmap indicates whether a corresponding time interval is allocated to the same MBS region as that allocated by the previous time interval.

20. The apparatus of claim 19, wherein the region allocation information comprises a first bitmap including a plurality of bits corresponding to the plurality of time intervals, and
each bit of the first bitmap indicates whether a corresponding time interval is allocated to the MBS region or to the non-MBS region,
wherein the MBS zone allocation information comprises a second bitmap including a plurality of bits corresponding to remaining subbands other than the first subband, among a plurality of subbands, and each bit of the second bitmap indicates whether a corresponding subband is allocated to the same MBS region as that allocated by the previous subband.

\* \* \* \* \*